Oct. 11, 1960  A. R. VOGEL ET AL  2,955,784
SERVO REGULATED ELEVATOR FEEL SYSTEM
Filed Feb. 27, 1956  5 Sheets-Sheet 1

INVENTORS:
Alvin R. Vogel
Edward C. Wirth
By Herbert E. Metcalf
Their Patent Attorney

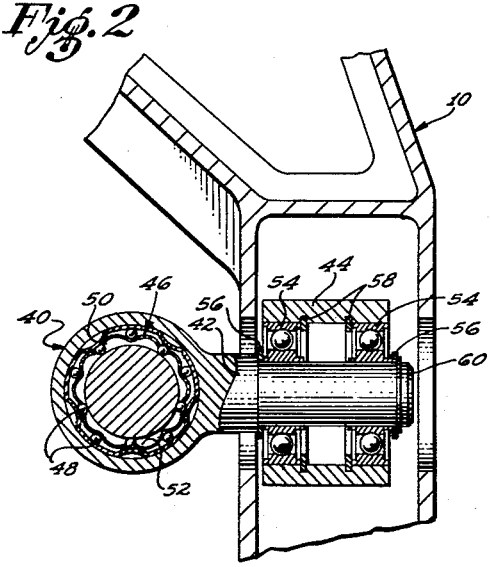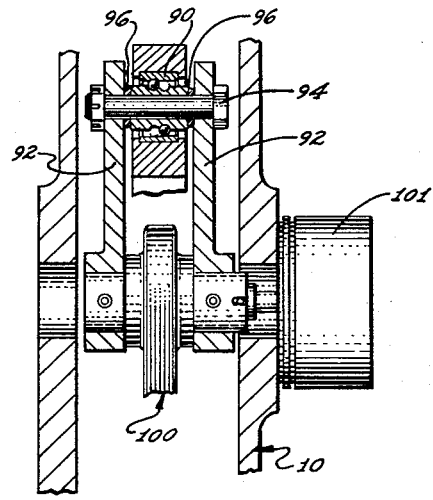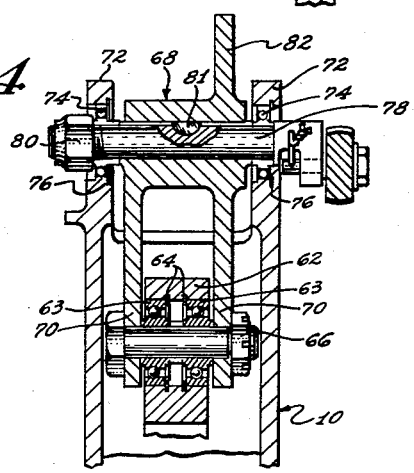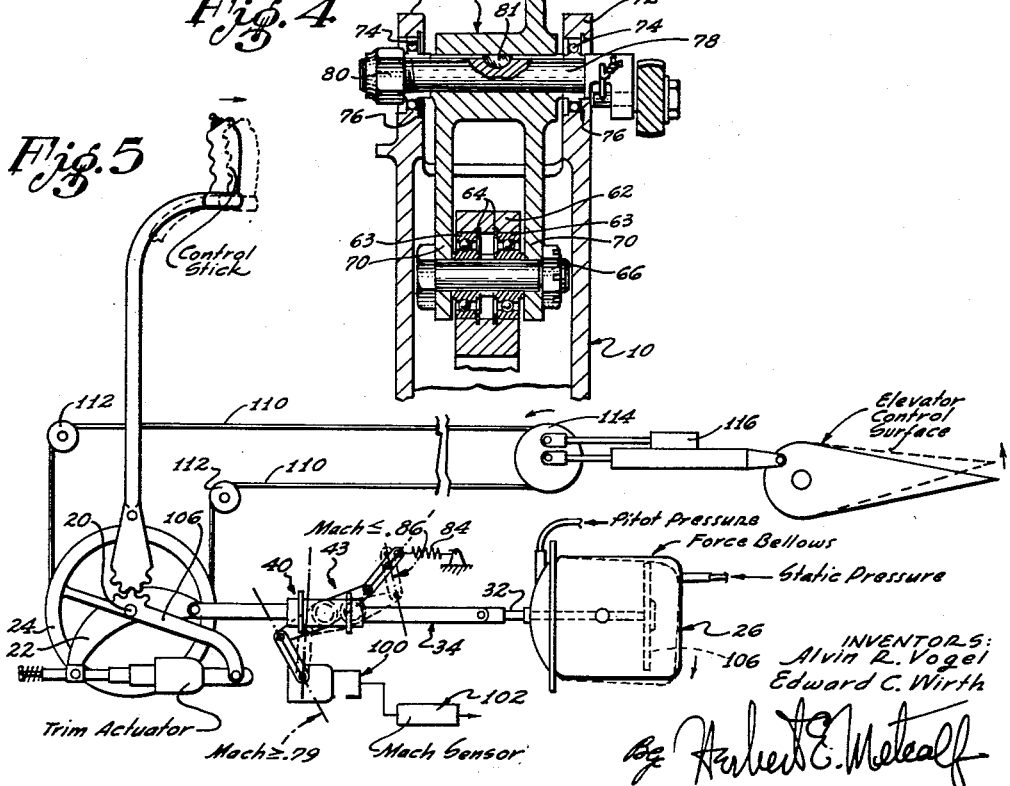

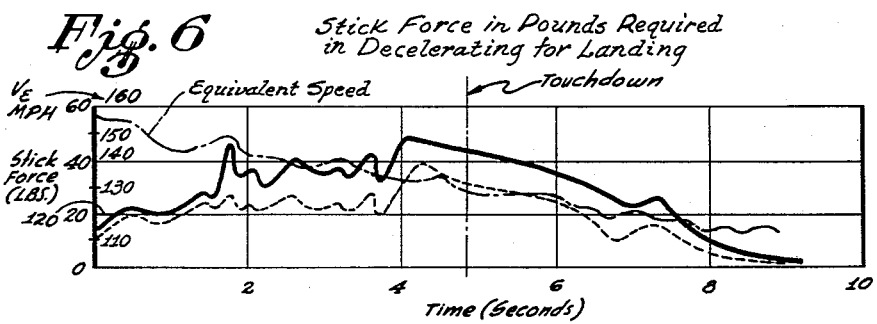
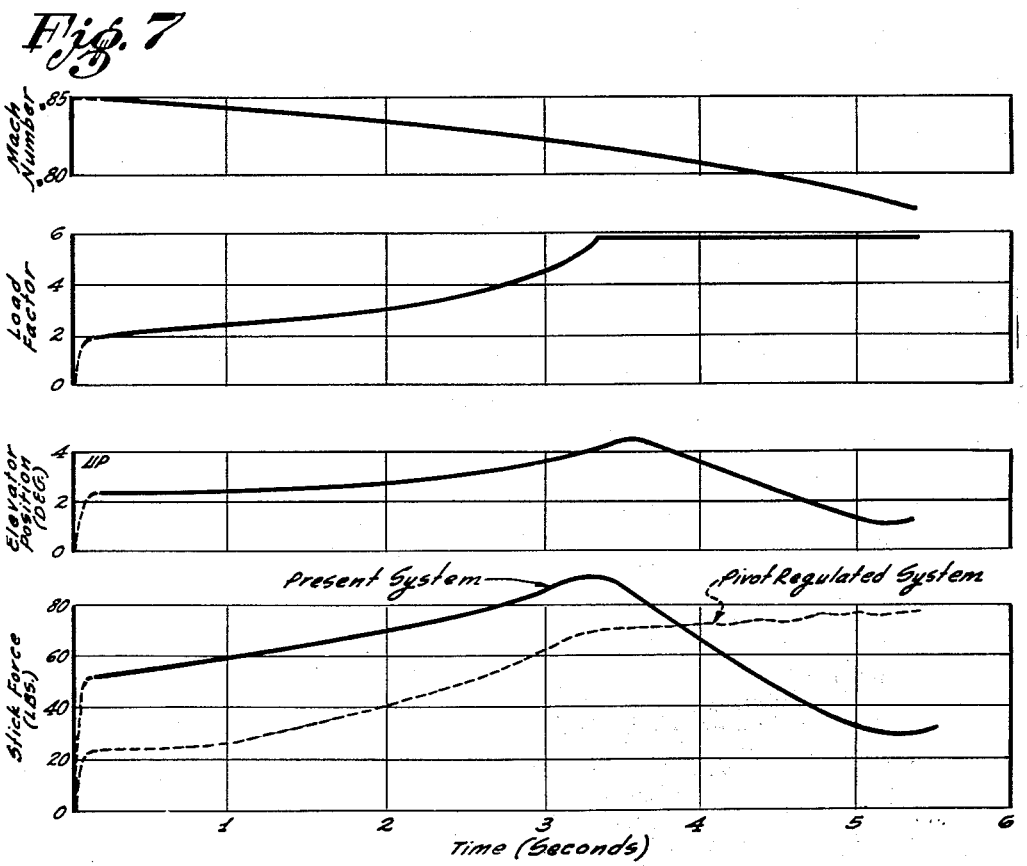

INVENTORS:
Alvin R. Vogel
Edward C. Wirth

Their Patent Attorney

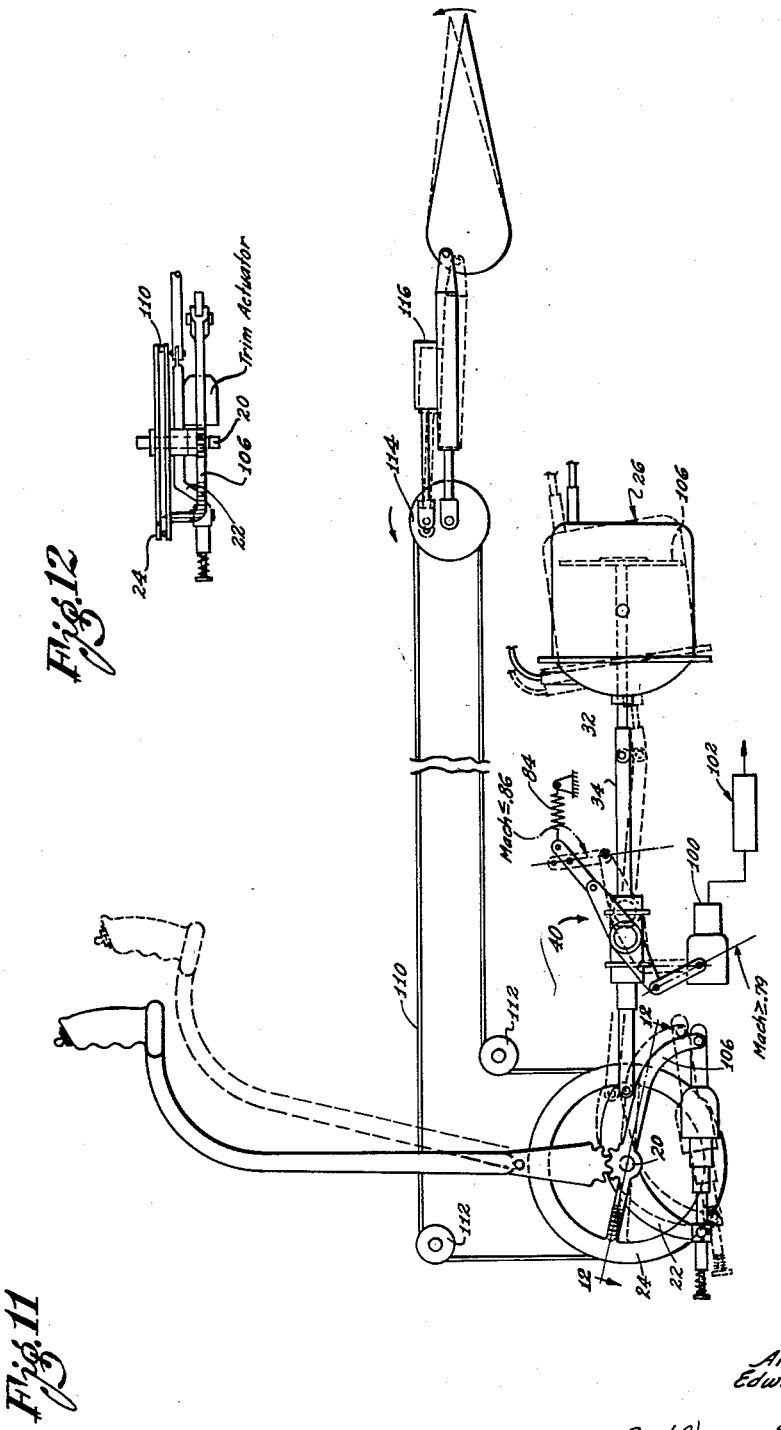

United States Patent Office 2,955,784
Patented Oct. 11, 1960

2,955,784

SERVO REGULATED ELEVATOR FEEL SYSTEM

Alvin R. Vogel and Edward C. Wirth, Los Angeles, Calif., assignors to Northrop Corporation, a corporation of California Filed Feb. 27, 1956, Ser. No. 568,041

7 Claims. (Cl. 244—83)

This invention has to do with control systems for aircraft and more particularly with a servo regulated elevator artificial feel system.

While transonic aircraft generally differ in their individual performance characteristics, depending upon their configuration, all exhibit certain similar control and stability peculiarities in the high subsonic and transonic speed ranges. These characteristics result from the rapid change of airflow patterns, the formation of shock waves on the lifting surfaces, and the attendant separated airflow. As a result of the changes in the magnitude and the relative position of these phenomena as Mach number varies, longitudinal trim, control, and stability characteristics may exhibit large and abrupt changes.

When the normal flight speed coincides with this "critical" flight region, it becomes highly desirable to provide the pilot with an aircraft which appears to him to possess adequate static and dynamic stability and suitable control sensitivity. When the aircraft is of the combat type, as well as the commercial and non-combat the full tactical effectiveness of transonic aircraft cannot be realized, for the pilot must exercise an unduly large amount of care merely to fly the aircraft safely and is therefore less able to concentrate on the accurate control of the weapon system.

The analysis of a pilot operated aircraft is essentially a problem in system dynamics including the pilot as an element of the system. It is assumed that the pilot flies an aircraft primarily by the application of a stick force rather than a stick deflection. However, the pilot, as included in the system, cannot be expressed analytically to a sufficient degree of accuracy, but his characteristics are relatively constant and may be so considered.

An object of the present invention is to provide a servo regulated artificial feel system that will give an improved steady state control stick force per "g" (the ratio of change in control stick force required to effect a change in aircraft load factor at constant speed; "g" being defined as gravity).

Another object of the present invention is to provide a servo regulated artificial feel system that will give an improved steady state control stick force per "u" (the ratio of change in control stick force required to effect a change in the aircraft's forward speed at unity load factor; "u" being defined as the speed of the aircraft).

Another object of this invention is to provide a servo regulated artificial feel system that will, above a certain Mach number, give a control stick force per "g" which will be made more nearly constant.

A yet further object of this invention is to provide a servo regulated artificial feel system that will, in the "tuck under" region, improve the stability of the stick force per knot characteristic.

Another object of this invention is to provide a servo regulated artificial feel system that will improve the control stick force characteristics during prolonged high speed pull-outs.

Another object of this invention is to provide a servo regulated artificial feel system that will accomplish a desirable reduction in landing forces on the control stick without adversely affecting the handling qualities in other flight conditions.

A yet further object of this invention is to provide a servo regulated artificial feel system that is readily and economically fabricated, easily installed into presently used control systems, irreversible (i.e. certain flying conditions and changes are not transmitted back through the system to the pilot), and fail safe.

This invention may be considered an improvement over the patent bearing Number 2,639,875, issued to Alvin R. Vogel, and assigned to Northrop Aircraft, Inc.

The system is predicated on a mechanization which can precisely and automatically position the pivot axis of the idler link or rod as a function of Mach number.

Figure 2 is a fragmentary, cross-sectional view taken on line 2—2 of Figure 1 looking in the direction indicated.

Figure 3 is a fragmentary, cross-sectional view taken on line 3—3 of Figure 1 looking in the direction of the arrows.

Figure 4 is a fragmentary, cross-sectional view taken on line 4—4 of Figure 1 looking in the direction indicated.

Figure 5 is a schematic view illustrating the invention and showing its relationship with related structure.

Figure 6 is a "landing history" curve or graph illustrating the relationship of the present invention as compared with other systems.

Figure 7 is a "critical" maneuver series of curves or graphs illustrating the relationship of the present invention as compared with other systems.

Figure 11 is a schematic view illustrating the invention with the control stick and associated structure, shown in dotted line, in an extreme, exaggerated position.

Figure 12 is a cross-sectional view taken on line 12—12 of Figure 11.

Figure 1:
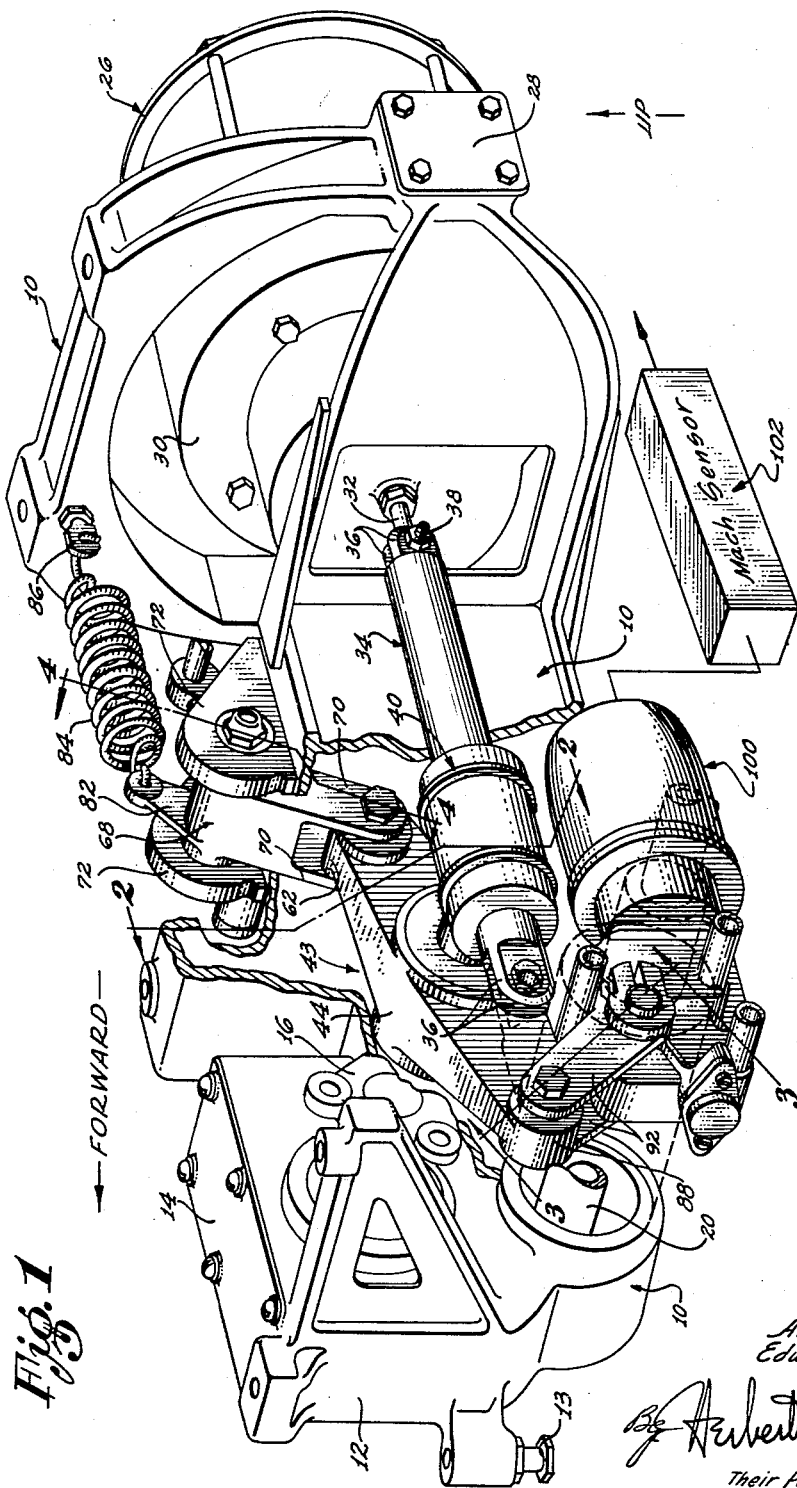
Figure 1 is a fragmentary, perspective view illustrating and having embodied therein the present invention; structure being broken away and shown in dotted line for the purpose of more clearly showing the invention.

Referring to the drawings for a more detailed description of the present invention, 10 designates a support frame which has thereon a housing 12. Removably attached to the housing 12 by screws is a cover 14. The structure located in the housing 12 is identical to that which may be found in the patent previously mentioned. Integral with, what may be considered the forward end of the invention, the housing is a quadrant stop 13. Projecting from housing 12 is a shaft to which is attached the control stick torque tube attach flange 16. Also projecting from the housing 12 is an output shaft 20 that is interconnected to the torque tube through the medium of sector gears and the like.

The output shaft 20 is further connected to a shaft arm 22 and cable pulley 24, shown schematically in Figure 5.

The structure just described may, for purposes of simplicity, be referred to as the control stick equipment.

Located in opposed relation to housing 12 and mounted on the frame 10 is a bellows type force producer 26. This force producer is pivoted on the frame and about the axis designated 28. Extending out the forward end of the force producer casing 30 is shaft 32. Again attention is directed to Patent 2,639,875, wherein it may be determined the structure that is located in the casing 30 and operationally interconnected to shaft 32.

Between the casing 30 of the force producer 26 and the output shaft 20 and pivotally interconnected to each is an elongated idler link or rod 34. Each end of the idler link is bifurcated and through the presented legs 36 extends a nut and bolt assembly 38, only one of which is shown, that retains the idler rod connected to the shaft 32 and interconnected to the output shaft 20.

The idler link or rod 34 extends through a trunnion 40. The trunnion has a stub shaft 42 integral therewith which projects into and is supported generally by a four bar link system 43 and particularly in an interconnect link 44 and is pivoted to rotate on a lateral axis.

Within the trunnion, as shown in Figure 2, is pressed a linear ball bearing 46 which permits the idler rod or link 34 to roll axially therethrough.

The linear ball bearing 46 comprises a plurality of oblong circuits of balls 48, each of which has the balls in one of its straight sides in bearing contact between the inner surface of a bearing sleeve 50 and the rod 34. The load is rolled freely along on the balls in this part of the circuit without rocking relative to the trunnion. A retainer 52 within the sleeve guides the balls 48 in their proper path.

It may be determined, by referring to Figure 2 of the drawings, that the stub shaft 42 extends through an opening in the frame 10. Further, the stub shaft 42 intermediate its ends is reduced in diameter. The reduced portion of the stub shaft 42 is supported in the interconnect link 44 by a pair of spaced apart ball bearings 54. On what may be considered the exterior side of each bearing 54 is a washer 56 and on the interior side is a retainer ring 58. Adjacent the washer 56 on the free end of stub shaft 42 is another snap or retainer ring 60.

The interconnect link 44 is elongated, irregular, but symmetrical in configuration. One end 62 has an opening therethrough that has pressed thereinto a pair of spaced apart ball bearings 63 (Figure 4). Again, located on the interior side of each bearing is a retainer ring 64. Extending through the bearings and the interconnect link 44 is a bolt and nut assembly 66 that pivotally retains thereon an idler arm 68.

The idler arm is bifurcated on that end adjacent the interconnect link 44 and the provided legs 70 straddle the latter in the manner illustrated.

That end of the idler arm 68 opposed to interconnect link 44 is positioned between a pair of spaced apart ears 72 integral with the frame 10. Each ear 72 has an opening therethrough and a ball bearing 74 pressed therein. Adjacent the exterior side of each bearing is a retainer ring 76. Extending through each bearing 74 and an opening in the idler arm to pivotally retain the latter on the frame 10 is a shaft 78, having a nut 80 threaded thereon. In order to retain the shaft 78 properly positioned within the idler arm 68 a key 81 is provided for the purpose. As may be determined by referring to Figure 1 of the drawings, idler arm 68 has a projection 82 with an opening therein to receive one end of an antibacklash spring 84. The end of the spring 84 opposed to the idler arm 68 is attached to a fitting 86 that is in turn secured to the frame 10. Another backlash spring, not shown, is provided but neither are considered a part of this invention.

Attention is directed to Figures 1 and 3 and end 88 of the interconnect link 44, which is that end opposed to end 62. This end also has an opening therein into which is pressed a self-aligning bearing 90.

A pair of spaced apart, elongated driver arms 92 are pivotally retained on end 88 by a bolt and nut assembly 94. Located between the ends of each of the arms 92, retained on interconnect link 44 and bearing 90, is a spacer 96. That end of each of the arms 92 in opposed relation to end 88 of the interconnect link 44 is pivotally secured to a conventional electrical or hydraulic servo actuator 100. That portion of the actuator 100 to which the arms 92 are secured has a potentiometer 101 thereon. The servo actuator 100 contains as a part of the structure a motor and gear box. The servo actuator when energized causes the driver arms 92, idler arm 68 and interconnect link 44 to move up and down and rotate back and forth from the solid line to the dotted line position illustrated in Figure 5 of the drawings.

The servo actuator 100 is energized by a Mach sensor or Machmeter 102 schematically illustrated in Figures 1 and 5. Both the servo actuator 100 and Mach sensor 102 are conventional, readily available, commercial items.

The Mach sensor, for purposes of clearly defining the invention, functions, in relation to the speed of the aircraft. In other words, the Mach sensor is a sensitive panel Machmeter which has been modified by the addition of a tapped potentiometer positioned by the output shaft which normally moves the pointer. Proper interconnection of the potentiometer taps results in an output voltage which is the desired function of the Mach number. As a result of this structure an electrical signal generated by the Mach sensor 102 positions the servo actuator 100. An example of the general operation and not a limitation of the Mach sensor is as follows: For Pitot and static pressures corresponding to Mach numbers of .79 and .86, the accuracy of the sensor at 12,000 feet is −.002 Mach number. The static threshold and revolution of the Mach sensitive portion of the sensor is within −.002 Mach number. The physical construction of the sensor is such that the transient response of Mach number output to a small step change in input Pitot pressure is a response time of .1 to .3 second.

The servo actuator 100 is a rotary type positioned servo mounted coaxially with the lower pivot control link 92 and connected by a spline engagement. It is powered by two phase 400 cycle A.C. motor. The output shaft is driven through an irreversible gear train. Servo position feedback is obtained from a potentiometer which is an integral part of the actuator 100.

The general operation is as follows: The four-bar linkage system 43 carrying the idler rod pivot is driven by the positional servo actuator 100 which follows an electrical command voltage generated in the Mach sensor 102; the position of the pivot being proportional to the electrical command voltage.

By way of an example of the operation of the servo actuator 100; the actuator works against a full load equivalent to 80 pounds at the stick, at a speed of total travel in 4.5 seconds. This operation results from an input voltage corresponding to an error of less than .0055 Mach number. Under no load the servo should not be capable of a speed greater than total travel in 3 seconds. The error voltage required to start the servo under full load should be equivalent to .003 Mach number or less. The transient response time of the servo to small inputs should be one third seconds or less.

The schematic illustration in Figure 5 will be referred to for the purpose of defining the function and operation of the invention. Therefore a brief description of Figure 5 will be given for purposes of orientation.

The control stick, properly identified, having a gear interconnected thereto, meshes with a gear on an arm assembly 22. Arm assembly 22 as well as arm 106 are secured to output shaft 20. Further, arm assembly 22 is interconnected to a trim actuator and idler link or rod 34.

The output shaft 20 is connected to cable pulley 24 which has threaded thereon cables 110. The cables are also threaded over idler rollers 112 and another cable pulley 114. Interconnected to cable pulley 114 is the automatic flight control mechanism 116 that is connected to, in this case, the elevators.

Indicia are applied to the balance of the structure that will adequately identify the same.

The operation of the invention is as follows, and again attention is directed to Figure 5 as well as the curves and graphs.

Figure 9:
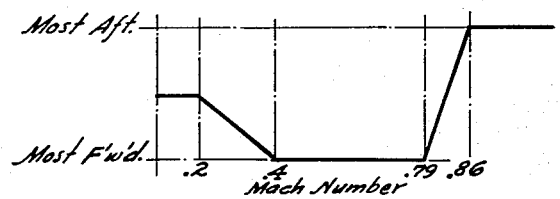
Figure 9 is a curve or graph illustrating the pivot position of the present invention at various Mach numbers.
Figure 10:
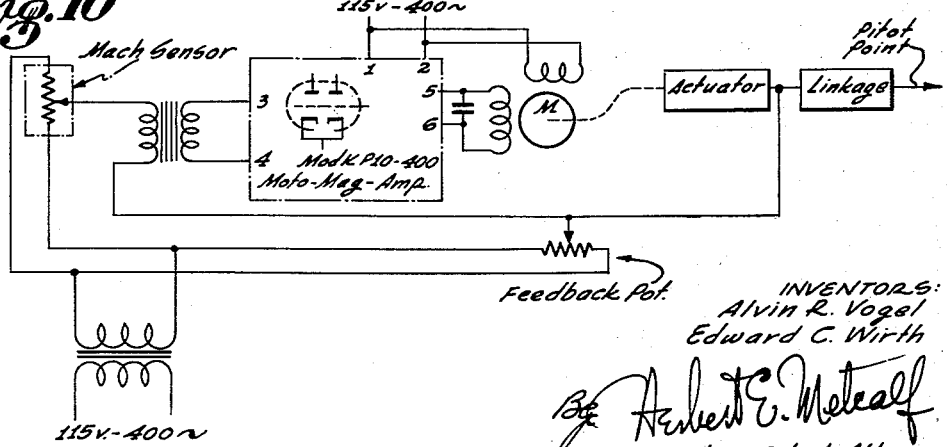
Figure 10 is a schematic wiring diagram illustrating electrical apparatus connections as applied to the present invention.

It is necessary to refer to Figure 9 for the purpose of explaining how the Mach sensor 102 affects the idler link or rod 34, the interconnect link 44, the idler arm 68, and the driver arms 92. The last three mentioned elements will, where convenient, be referred to as the four bar link system 43.

It is to be understood that wherever a Mach number is used it is used only for the purpose of presenting an example. The Mach numbers are not to be considered a limitation.

The Mach sensor 102, through the servo actuator 100, causes the four bar link system 43 to move aft or from the solid to the dotted line position when the aircraft is going from Mach .4 to Mach .2 and of course the four bar link system 43 is in an aft condition and moves forward when the aircraft is going from Mach 0 to Mach .4. When the aircraft is flying between Mach .4 and Mach .79 the four bar link system 43 is in the most forward or solid line position illustrated in Figure 5. From Mach .79 to Mach .86 the four bar link system 43 again moves progressively aft to its limit. It is to be noted that there is a greater amount of aft movement of the link system from Mach .79 to Mach .86 than there is from Mach .4 to Mach .2.

Figure 9 illustrates the position of the four bar link system 43 during the entire period of flight and shows that the system varies as a function of the speed of the aircraft.

Figure 8:
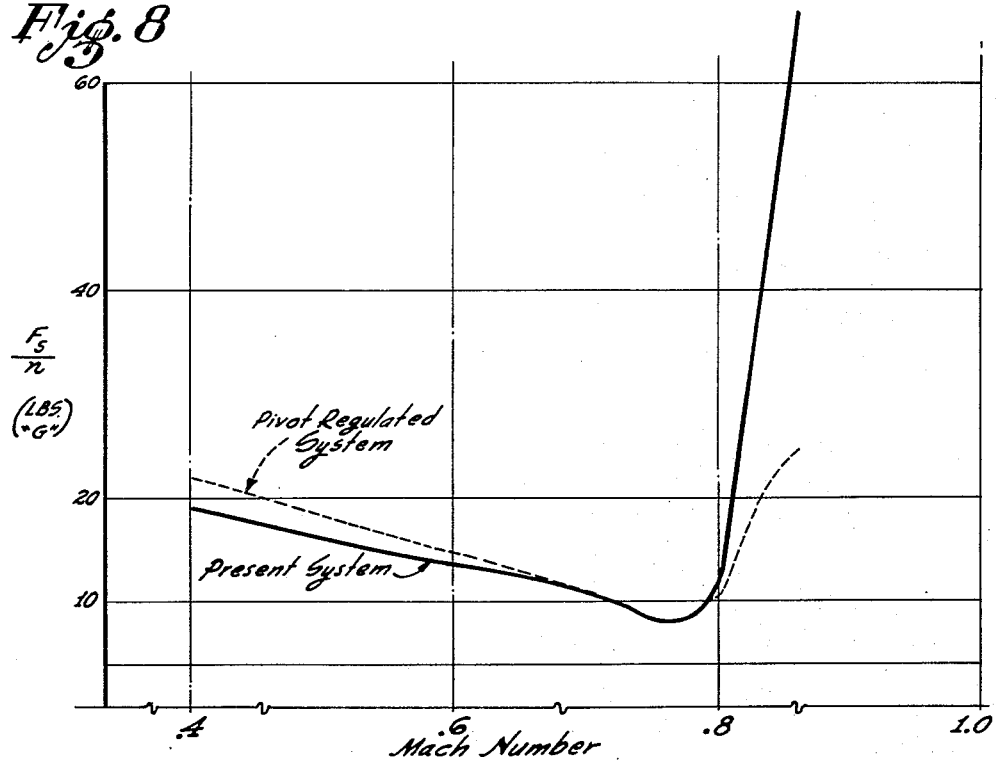
Figure 8 is a "tuck under" region curve or graph illustrating the relationship of the present invention as compared with other systems.

Refer now to Figure 8 and what may be considered the "tuck under" region curve. In the "tuck under" region, the sign of the stick force per "$u$" characteristic, the speed of the aircraft, is opposite to that which exists in other flight regions. This will be explained in that which follows. The solid line curve, as indicated, represents the presently used systems of automatic flight controls including an artificial feel system, but absent the pivot regulation system. The dotted line curve represents the present invention or pivot regulated system. The symbol $Fs/n$ represents lbs. "$g$" or stick force per "$g$" load on the aircraft. The horizontal indicia represent the Mach number.

It may be seen that, as the Mach number increases, the stick force required to impose a 1.0 "$g$" on the aircraft decreases, until the aircraft reaches approximately Mach .78. At Mach .78 the curve suddenly reverses itself and rapidly rises to a point where the force required, by the pilot of the aircraft, to impose a 1.0 "$g$" on the aircraft through the control stick is very large. This area of the curve is known as the "tuck under" region and is defined as follows: that range of the aircraft speed where there is a reversal of applied stick forces that is required to increase the load factor on the aircraft. Obviously if, under the present system, the pilot wished to apply a 1 "$g$" it would be very likely that he would over control. The result of course would be disastrous. On the other hand, the pilot would probably be able to recover, but in doing so all his attention would be devoted to correcting the over control and little, if any, attention could or would be directed to other equally important matters.

It may be stated that an automatic elevator trim change would effectively aid in giving the result of a more steady state stick force per "$u$."

The described characteristics, as applied to the "tuck under" region, are the result of a rapid change of airflow patterns, the formation of shock waves on the lifting surfaces, and the attendant separated airflow. As a result of the changes in the magnitude and the relative position of these phenomena as Mach number varies, longitudinal trim, control and stability characteristics may exhibit large and abrupt changes.

The forces required to move the control stick are of course transmitted through the force producer or bellows 26, the idler link or rod 34 and the control stick equipment.

Refer again to Figure 5 for a partial mechanical explanation of the above. Ram or Pitot air pressure enters at the place indicated. This pressure is imposed on the diaphragm 106 which is transmitted to the control stick. The more Pitot pressure imposed initially, i.e. between Mach 0 and Mach .78, the less force is required to move the control stick to apply 1.0 "$g$" on the aircraft. In other words, as the aircraft speed and Pitot pressure increase a diminishing amount of force is required to be applied on the stick to impose a force of 1.0 $g$ on the aircraft. When the above phenomenon of pilot pressure versus control stick force occurs in the "tuck under" region, i.e. Mach .78, the reverse is true. This "tuck under" region occurs in all aircraft flying in this subsonic or transonic region.

Now, attention is directed to the pivot regulated system shown by the dotted line in Figure 8. Between Mach .4 and Mach .79 the four bar link system 43 is as far forward as possible as in the solid line position illustrated in Figure 5 of the drawings. In this position the force producer or bellows 26 coupled with the pilot pressure has the greatest mechanical advantage over the control stick. Substantially the same curve is applicable to the pivot regulated system as is applicable to the present system from Mach .4 to Mach .78. At Mach .79 the Mach sensor 102 energizes the servo actuator 100 which causes the driver arms 92 to rotate or pivot from the solid toward the dotted line position. As a result the pivot point of the idler link or rod 34, represented by the stub shaft 42, is caused to shift aft and up. The driver arms 92, in order to cause this shift in the pivot point, rotates and moves aft the interconnect link 44 which in turn rotates the idler arm 68. Moving of the pivot point up and aft causes the control stick to move aft, causing an elevator trim change, and the force producer 26 to rotate about its axis. As previously stated the elevator trim change would result in giving a more steady state stick force per "$u$."

As the Mach number increases the four bar link system 43 is caused to move toward the dotted line position shown in Figure 5. The result of this movement is that the mechanical advantages of the force producer 26 over the control stick is reduced and the dotted line curve in Figure 8 is as shown. In other words, less force is required, above Mach .79, to impose a 1 "$g$" on the aircraft than is required in the present system. It may be stated now that in the "tuck under" region, i.e. Mach .78 to Mach .86, the control stick force per knot is improved or becomes stable and the control stick force per "$g$" becomes relatively constant. Further, it may be stated the pivot regulated artificial feel system improves the steady state control stick force per "$u$," i.e. the ratio of change in control stick force required to effect a change in the aircraft's forward speed at unity load factor.

The next curves to consider are those shown in Figure 7. It is believed that an introduction to the maneuver represented by these curves would be beneficial toward clarifying some obscure features.

During constant speed pull-ups and turns, the most significant characteristic of the aircraft relating to good pilot handling qualities is its load factor response to pilot applied control stick force input. One important quantity which is necessary to describe this load factor response is the steady state stick force per "$g$."

Prolonged high speed pull-ups is a type of maneuver that is mandatory for certain types of aircraft that are tactically on lead pursuit courses, breakaway when on lead collision courses, in high speed dives and when employing evasive tactics.

A prolonged high speed pull-up may be considered a "critical maneuver" which is defined as follows. The aircraft is initially flying at constant speed above the critical Mach number and is trimmed at unity load factor. An application of maximum up-elevator and dive brake deflections and reduction in engine thrust causes speed to undergo a rapid and continuous decrease. The elevator is deflected so as to produce maximum load factor until such time as limit load factor can be obtained, after which time the elevator is positioned so as to maintain limit load factor.

Specifically, the handling characteristic that is considered undesirable in the "critical maneuver" is the rather rapid reduction in pilot's control stick force and elevator deflection required to maintain constant load factor as the decreasing Mach number approaches $M=.78$. Figure 7 shows that the control stick force drops from 90 lbs. to 25 lbs. in less than two (2) seconds.

During this type of maneuver, the pilot can prevent load factor from exceeding structural limits but the accuracy of control is impaired.

Ideally, control stick force per "g" in the "critical maneuver" should be relatively constant with respect to speed, and stick force per "u" should be negative (push force required at the stick for an increase in airspeed) and within certain desirable limits. As a result, an ideal stick force in the critical maneuver should have a continually increasing characteristic.

With this introduction attention is directed to Figure 7. The solid line curve in the first three curves, listed from top to bottom, is applicable in the presently used systems as well as the pivot regulated system. The solid line curve in the bottom graph represents the present systems and the dotted line curve represents the pivot regulated system of this invention.

Referring to the uppermost or top curve of Figure 7, it may be seen that the aircraft initially is flying at a speed of Mach .85 when it entered or started the critical maneuver.

A ram air or Pitot pressure was being imposed on the diaphragm in the force producer 26. The four bar link system 43 is in the dotted line position where the mechanical advantage of the force producer over the control stick is at a reduced value. In other words the pivot axis of the idler link 34 is up and aft resulting in the elevators being in a trimmed condition where control stick force is zero. As the "critical maneuver" is maintained the forward speed of the aircraft is reduced from Mach .85 to about Mach .78 in a little over 5 seconds and the four bar link system 43 is caused to move toward the solid line position as the result of the Mach sensor 102 energizing the servo actuator 100.

When the pull-up is initiated the load factor or "g" force, second curve from top, increases rapidly from 0 to 2 in less time than a second and then gradually but certainly increases to approximately 6, in over three seconds, which is the limit load factor. At limit load factor which occurs as stated in a little over three seconds the pilot must deflect the elevators downwardly as may be determined by referring to the third curve from the top in Figure 7.

In order to accomplish the deflection of the elevator downwardly the pilot must move the control stick forward. This may be determined by referring to the bottom line of curves in Figure 7. In the present system when the pilot moves the control stick forward the stick force necessary to maintain limit load factor decreases rapidly. As stated previously, the stick force decreases from 90 lbs. to 25 lbs. in less than 2 seconds.

On the other hand, the pivot regulated system operates in the defined ideal manner. As the speed of the aircraft decreases the four bar link system 43 moves toward the solid line position shown in Figure 5. The result is that the force producer 26 acquires a continually increasing mechanical advantage of force over the control stick. Consequently, even though the pilot is moving the control stick forward and the elevators are being deflected downwardly, the force necessary to apply to the control stick to maintain limit load factor continues to increase.

As a result the ideal conditions previously referred to have been fulfilled. The various functions illustrated in Figure 7 are related to time for the reason that the last named is of extreme importance. All functions must occur within a given time period in order to obtain exact and ideal results. This relation of functions to time is not to be considered a limitation for the reason that the conditions will change to a greater or lesser degree for each aircraft.

The last graph to consider is the landing history curve illustrated in Figure 6. Control stick forces required to land an aircraft, having automatic flight control systems, are generally somewhat high.

As previously stated the Mach sensor 102 energizes the servo actuator to cause the four bar link system 43 to move aft at Mach .4 when the aircraft is decreasing in speed. In other words, from Mach number .4 to .2 the pivot point of the idler link 34 moves aft, and the mechanical advantage of the force producer 26 over the control stick is reduced. The result of this shift in mechanical advantage gives the dotted line curve of the pivot regulated system, in Figure 6, as compared to the solid line position of the presently used systems.

The irregularity of the curve is the result of the pilot making corrections in the elevators in order to obtain a proper "touch down." The stick force, in Figure 6, is related to time, in seconds, in order to illustrate the speed that is necessary to acquire proper control surface responses. It may be seen that in a matter of seconds, when the aircraft is approaching touch down, the stick, with its attending forces, is moved through a great many positions.

A summary of the servo regulated artificial feel system is as follows. The invented system is based on the observation that power control of the idler link 34 pivot can produce changes in mechanical advantage as well as changes in the zero force or trimmed position of the mechanism. Fore and aft motion of the pivot point alters the mechanical advantage, while up and down motion results in a "trim" change. Thus the system is predicated on a mechanization which can precisely and automatically position the pivot of the idler link or rod 34 as a function of Mach number.

Both the mechanical advantage and the "trim" changes are simultaneously accomplished by proper choice of the motion described by the four bar link system 43.

The pivot control link is an inverted four bar type having two simple arms pivoted on opposite sides of the interconnect link. The interconnect link carries the trunnion or pivot ball bushing.

The pivot control system may be expressed mathematically using various types of formulas. However, it is believed that the four bar link system 43, as used for shifting a pivot point, may be easily expressed by the simple use and understanding of vectors.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an aircraft artificial feel system having a frame;

a force producer on the frame that rotates about a pivot axis; control stick equipment on the frame interconnected to the control surfaces of the aircraft; an idler link, interconnecting the force producer and equipment, that rotates about a pivot point, the invention of which comprises a rotatable and reciprocable interconnect link connected to the idler link that provides the pivot point for the idler link; an idler arm pivotally mounted on the frame and pivotally connected to the interconnect link; and driver arms pivotally mounted on a servo actuator and the interconnect link whereby when the servo is actuated the pivot point of the idler link is shifted to alter the mechanical advantage of the force producer over the control stick equipment and alter the trim condition of the control surface of the aircraft.

2. In an aircraft artificial feel system having a frame; a force producer on the frame that rotates about a pivot axis; control stick equipment on the frame interconnected to the control surfaces of the aircraft; an idler link, interconnecting the force producer and equipment, that rotates about a pivot point, the invention of which comprises a rotatable and reciprocable member connected to the idler link that provides the pivot point for the idler link; an idler arm pivotally mounted on the frame and pivotally connected to the interconnect link; and a driver arm pivotally mounted on a servo actuator and the interconnect link whereby when the servo is actuated the pivot point of the idler link is shifted to alter the mechanical advantage of the force producer over the control stick equipment and alter the trim condition of the control surfaces of the aircraft.

3. In an aircraft artificial feel system having a frame; a force producer on the frame that rotates about a pivot axis; control stick equipment on the frame interconnected to the control surfaces of the aircraft; an idler link, interconnecting the force producer and equipment, that rotates about a pivot point, the invention of which comprises a rotatable and reciprocable interconnect link connected to the idler link that provides the pivot point for the idler link; means pivotally mounted on the frame and pivotally connected to the interconnect link; and a driver arm pivotally mounted on a servo actuator and the interconnect link whereby when the servo is actuated the pivot point of the idler link is shifted to alter the mechanical advantage of the force producer over the control stick equipment and alter the trim condition of the control surfaces of the aircraft.

4. In an aircraft artificial feel system having a frame; a force producer on the frame that rotates about a pivot axis; control stick equipment on the frame interconnected to the control surfaces of the aircraft; an idler link, interconnecting the force producer and equipment, that rotates about a pivot point, the invention of which comprises a rotatable and reciprocable interconnect link connected to the idler link that provides the pivot for the idler link; an idler arm pivotally mounted on the frame and pivotally connected to the interconnect link; and structure pivotally mounted on a servo actuator and the interconnect link whereby when the servo is actuated the pivot point of the idler link is shifted to alter the mechanical advantage of the force producer over the control stick equipment and alter the trim condition of the control surfaces of the aircraft.

5. In an aircraft artificial feel system having a frame; a force producer on the frame that rotates about a pivot axis; control stick equipment on the frame interconnected to the control surfaces of the aircraft; an idler link, interconnecting the force producer and equipment, that rotates about a pivot point, the invention of which comprises a rotatable and reciprocable member connected to the idler link that provides the pivot point for the idler link; means pivotally mounted on the frame and pivotally connected to the member; and structure pivotally mounted on a servo actuator and the member whereby when the servo is actuated the pivot point of the idler link is shifted to alter the mechanical advantage of the force producer over the control stick equipment and alter the trim condition of the control surfaces of the aircraft.

6. In an aircraft artificial feel system having a frame; a force producer on the frame that rotates about a pivot axis; control stick equipment on the frame interconnected to the control surfaces of the aircraft; an idler link, interconnecting the force producer and equipment, that rotates about a pivot point, the invention of which comprises a rotatable and reciprocable member connected to the idler link that provides the pivot point for the idler link; means pivotally mounted on the frame and pivotally connected to the member; and a driver arm pivotally mounted on a servo actuator and the member whereby when the servo is actuated the pivot point of the idler link is shifted to alter the mechanical advantage of the force producer over the control stick equipment and alter the trim condition of the control surface of the aircraft.

7. In an aircraft artificial feel system having a frame; a force producer on the frame that rotates about a pivot axis; control stick equipment on the frame interconnected to the control surfaces of the aircraft; an idler link, interconnecting the force producer and equipment, that rotates about a pivot point, the invention of which comprises a rotatable and reciprocable member connected to the idler link that provides the pivot point for the idler ink; an idler arm pivotally mounted on the frame and pivotally connected to the member; and structure pivotally mounted on a servo actuator and the member whereby when the servo is actuated the pivot point of the idler link is shifted to alter the mechanical advantage of the force producer over the control stick equipment and alter the trim condition of the control surface of the aircraft.

References Cited in the file of this patent

UNITED STATES PATENTS

| 2,205,610 | Van Ness | June 25, 1940 |
| 2,508,883 | Knowler | May 23, 1950 |
| 2,725,203 | Glatz et al. | Nov. 29, 1955 |

FOREIGN PATENTS

| 726,340 | Great Britain | Mar. 16, 1955 |
| 742,383 | Great Britain | Dec. 30, 1955 |
| 742,785 | Great Britain | Jan. 4, 1956 |